(12) United States Patent
Bortolamiol

(10) Patent No.: US 9,866,648 B2
(45) Date of Patent: Jan. 9, 2018

(54) AUTOMATIC TRANSMISSION OF USER PROFILE INFORMATION TO A WEB SERVER

(71) Applicant: Laurent Bortolamiol, San Jose, CA (US)

(72) Inventor: Laurent Bortolamiol, San Jose, CA (US)

(*) Notice: Subject to any disclaimer, the term of this patent is extended or adjusted under 35 U.S.C. 154(b) by 336 days.

(21) Appl. No.: 13/891,812

(22) Filed: May 10, 2013

(65) Prior Publication Data

US 2014/0337406 A1    Nov. 13, 2014

(51) Int. Cl.
*H04L 29/08* (2006.01)
*H04L 29/06* (2006.01)

(52) U.S. Cl.
CPC .......... *H04L 67/306* (2013.01); *H04L 63/083* (2013.01); *H04L 63/102* (2013.01); *H04L 67/02* (2013.01)

(58) Field of Classification Search
CPC ..... H04L 63/102; H04L 63/083; H04L 67/02; H04L 67/306
See application file for complete search history.

(56) References Cited

U.S. PATENT DOCUMENTS

| | | | | |
|---|---|---|---|---|
| 5,586,260 A | * | 12/1996 | Hu | G06F 21/33 704/272 |
| 5,774,879 A | * | 6/1998 | Custy et al. | 705/35 |
| 6,446,048 B1 | * | 9/2002 | Wells | G06Q 20/102 705/35 |
| 6,944,585 B1 | * | 9/2005 | Pawson | G06F 17/30035 348/14.01 |
| 8,429,710 B1 | * | 4/2013 | Schepis | G06Q 10/10 707/705 |
| 2002/0023002 A1 | * | 2/2002 | Staehelin | G06Q 30/02 705/14.66 |
| 2002/0059132 A1 | * | 5/2002 | Quay et al. | 705/37 |
| 2002/0133477 A1 | * | 9/2002 | Abel | 707/1 |
| 2003/0080997 A1 | * | 5/2003 | Fuehren | G06Q 30/02 715/744 |
| 2007/0100796 A1 | * | 5/2007 | Wang | G06Q 30/02 |
| 2007/0124471 A1 | * | 5/2007 | Harada | G06Q 20/206 709/225 |
| 2008/0228870 A1 | * | 9/2008 | Schweier | H04L 67/20 709/203 |
| 2008/0262952 A1 | * | 10/2008 | Channell | G06Q 30/02 705/35 |
| 2010/0057830 A1 | * | 3/2010 | Takala | H04W 4/02 709/203 |
| 2010/0153525 A1 | * | 6/2010 | Parekh et al. | 709/221 |
| 2010/0325270 A1 | * | 12/2010 | Ishizaka | F24F 11/0086 709/224 |
| 2011/0219421 A1 | * | 9/2011 | Ullman | G06Q 30/02 725/117 |
| 2012/0290977 A1 | * | 11/2012 | Devecka | H04W 4/206 715/810 |
| 2013/0185285 A1 | * | 7/2013 | Shuman | G06F 17/30554 707/722 |
| 2013/0305280 A1 | * | 11/2013 | Fleischman | 725/34 |

* cited by examiner

*Primary Examiner* — Chris Parry
*Assistant Examiner* — Stephen Houlihan
(74) *Attorney, Agent, or Firm* — DLA Piper LLP (US)

(57) ABSTRACT

A method and apparatus for the automatic transmission of user profile information to a web server are disclosed.

20 Claims, 11 Drawing Sheets

AUTOMATIC TRANSMISSION OF USER PROFILE INFORMATION TO A WEB SERVER

TECHNICAL FIELD

A method and apparatus for the automatic transmission of user profile information to a web server are disclosed.

BACKGROUND OF THE INVENTION

Web browsers and web sites are well-known. In recent years, the operators of web sites have become interested in obtaining as much data about each user as possible. For example, web sites often are designed to obtain demographic data from users, such as age, gender, geographic location, occupation, etc. Once a web server obtains such information, it can tailor the content of the web site based on that information.

For example, a web server (or an external advertising server) can tailor the content of advertisements to send to each user. The web server also can tailor other aspects of the web site to a particular user. For example, if the web server knows that a user likes NFL football, it can prioritize content about football to ensure that articles or blogs about football appear on the top of a web page when the user accesses the web site.

In prior art systems, if a user wished to have a customized web experience, the user needed to provide information to the web site, such as by setting up an account with the web site and filling out a profile form. Thereafter, the web site would associate that information with the user whenever the user logged into the site, which typically required the user to enter a name and password each time he or she accessed the site. This could be a cumbersome process for the user and prevents the user from experiencing a seamless web experience.

What is needed is a mechanism by which a web server can obtain profile information about a user without the user logging into the web site or web server. This would be more convenient for users and also would ensure that the web server can automatically obtain a user's profile information even if he or she never logs in.

SUMMARY OF THE INVENTION

The aforementioned problem and needs are addressed through embodiments of software modules used in conjunction with a web browser or other software running on a client computer that can obtain profile information from a user and communicate that profile information to a profile server. The profile server automatically provides the profile information to a web server when the user attempts to access the web server or a web site operated by the web server.

DETAILED DESCRIPTION OF THE PREFERRED EMBODIMENTS

Figure 1:
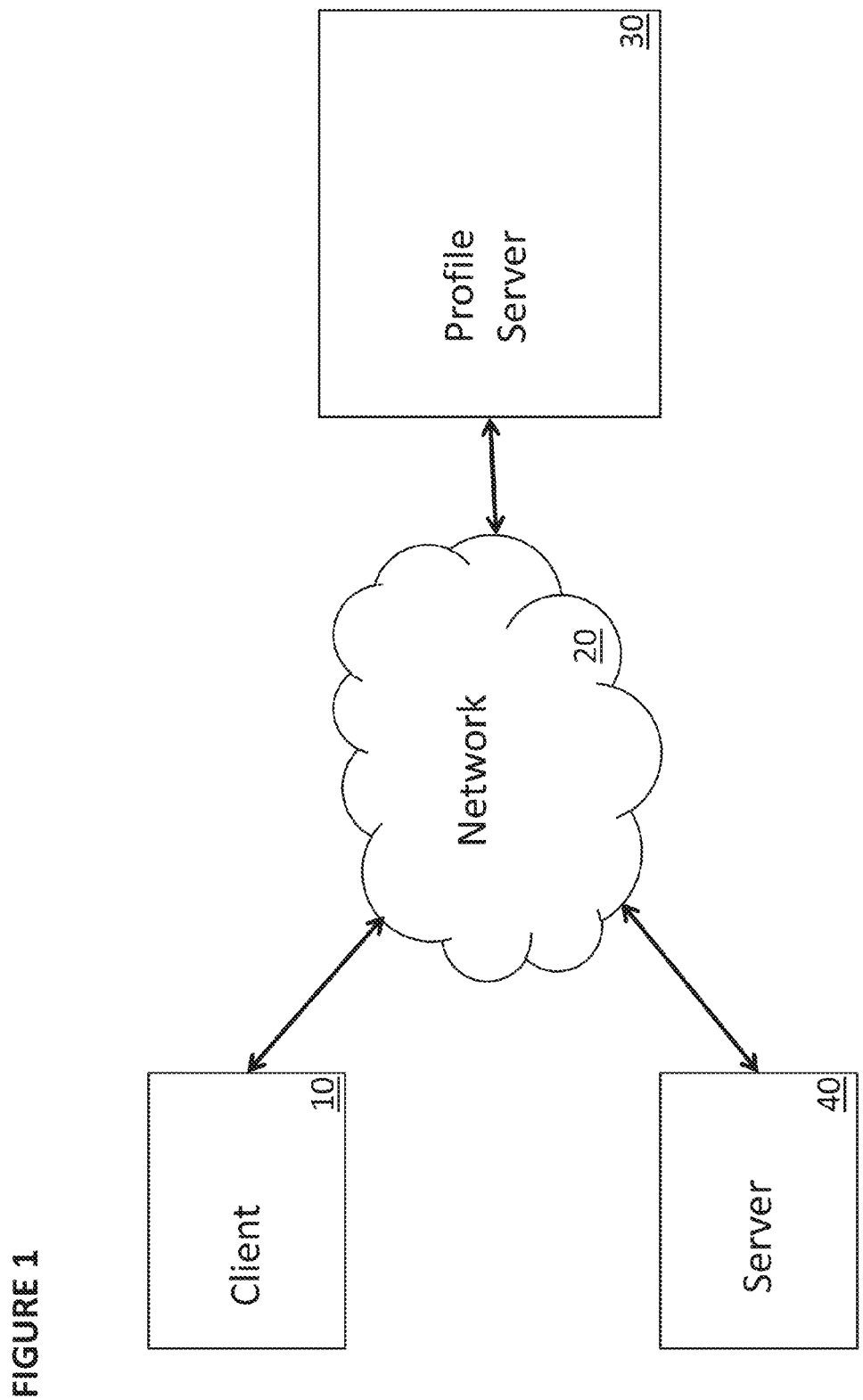
FIG. 1 depicts an embodiment of a system for transferring profile information.

An embodiment is shown in FIG. 1. Client 10 is a computer, such as a desktop, notebook, mobile device, tablet, appliance, or any other type of computing device that is network enabled. Client 10 comprises one or more processors, memory, and non-volatile storage such as a hard disk drive or flash memory array. Client 10 is coupled to network 20. Network 20 can be any type of network, such as the Internet, and can be hardwired, wireless, or some combination of the two.

Server 40 is a computer that can serve files and/or data over network 20. Server 40 comprises one or more processors, memory, and non-volatile storage such as a hard disk drive or flash memory array. In this example, server 40 can operate a web server. In this configuration, client 10 can access a web site operated by server 40 over network 20.

Profile data server 30 also is a computer that can serve files and/or data over network 20. Profile data server 30 comprises one or more processors, memory, and non-volatile storage such as a hard disk drive or flash memory array. Profile data server 30 has unique role that will be discussed in greater detail in the figures that follow.

Figure 2:
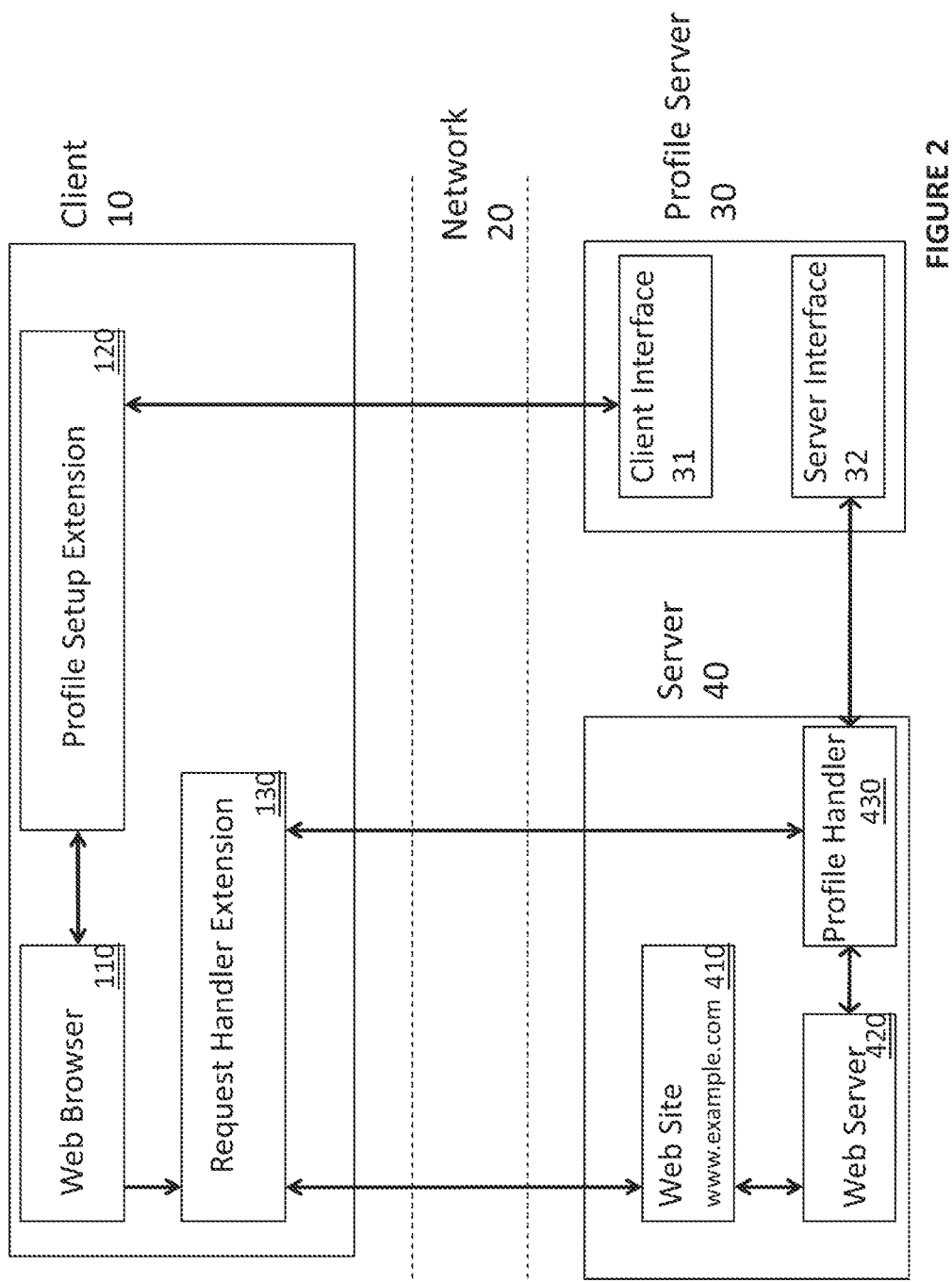
FIG. 2 depicts additional detail of an embodiment of a system for transferring profile information.

With reference to FIG. 2, client 10 optionally comprises web browser 110. Web browsers, such as Microsoft Internet Explorer and Google Chrome, are well-known in the art. Instead of a web browser 110, client 10 could comprise other software that facilitates network communication, such as a native mobile device application.

Client 10 further comprises request handler extension 130 and profile setup extension 120. Request handler extension 130 and profile setup extension 120 each are software modules comprising lines of code. Request handler extension 130 and profile setup extension 120 are executed by one or more of the processors of client 10. Request handler extension 130 and profile setup extension 120 can be modules that work in conjunction with web browser 110 (or other software), or in the alternative, they can be part of web browser 110 (or other software).

Server 40 comprises web server 420. Typically, web server 420 is a software application that hosts a web site 410 on the Internet or other network. Web site 410 can comprise, among other things, a set of HTML files and associated data stored within server 40. One of ordinary skill in the art will appreciate, however, that web server 420 is able to communicate with client 10 directly without using web site 410. One will also appreciate that web server 420 does not necessarily need to host a web site 410.

Server 40 further comprises profile handler 430. Profile handler 430 is a software module comprising lines of code. Profile handler 430 is executed by one or more of the processors of server 40. In its simplest form profile handler 430 can be a web page within web site 410 that is configured to look at requests received from Client 10 or other clients and to send any profile ID in those requests to profile server 30, and to then receive from profile server 30 any profile information associated with that profile ID.

Profile server 30 optionally comprises client interface 31 and server interface 32. Client interface 31 is a software module comprising lines of code to interact with profile setup extension 120 within client 10. Server interface 32 is a software module comprising lines of code to interact with profile handler 430.

Profile setup extension 120 optionally generates user interfaces for obtaining profile information from a particular user of client 10. For example, when web browser 110 is used for the first time profile setup extension 120 can ask the user questions and store the user's answers. Profile setup extension 120 also can do this periodically, or upon the occurrence of certain events (such as when client 10 visits a "registered web site" or interacts with a "registered web server," discussed below, for the first time).

Figures 3, 4:
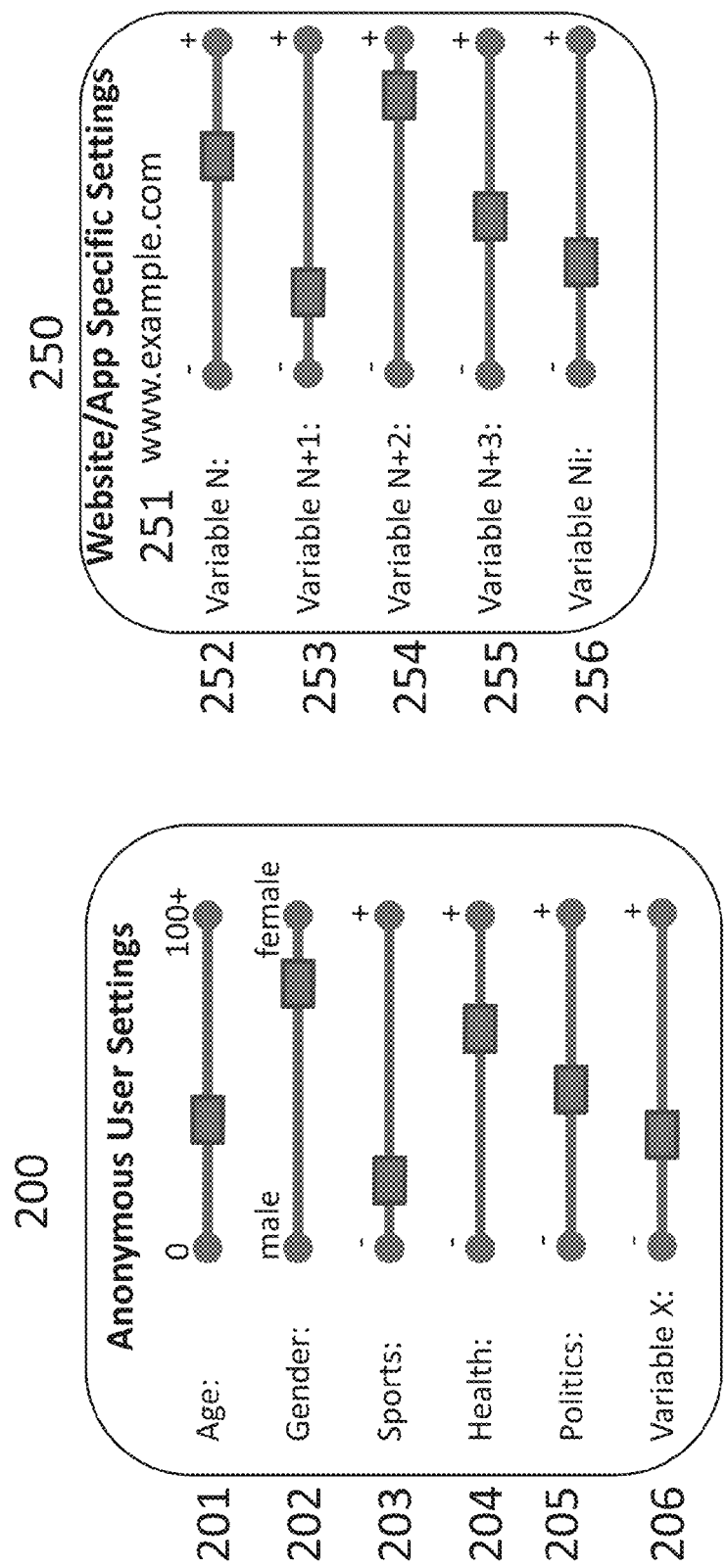
FIG. 3 depicts an embodiment of a user interface for obtaining profile information.
FIG. 4 depicts another embodiment of a user interface for obtaining profile information.

FIG. 3 depicts an exemplary user interface 200 that profile setup extension 120 can generate on client 10. In this example, user interface 200 obtains information about User 15 that is general in nature and might be of interest to many or all web site operators, which can be referred to as generic data 150. For example, most commercial web site operators are extremely interested in knowing the age and gender of users who access their web sites.

User interface 200 comprises a series of input devices (such as HTML text boxes, HTML buttons, HTML pull-down menus, or sliding-scale devices, etc.) that enable User 15 to input profile information. For example, in this example, input device 201 obtains information about age, input device 202 obtains information about gender, input device 203 obtains information about sports, input device 204 obtains information about health, input device 205 obtains information about politics, and input device 206 obtains information about Category X (which can be any category of interest). The information obtained can be a number (as would be the case with input device 201 and age) or a selection from among options (as would be the case with input device 202 and gender) or can reflect the user's relative interest in a topic (as would be the case with input device 203 and sports).

FIG. 4 depicts another exemplary user interface 250 that profile setup extension 120 can generate on client 10. User interface 250 obtains information that is specifically requested by web server 420, which can be referred to as custom data 160. Profile handler 430 asks web server 420 for any profile information that it wishes to obtain from users. This can happen, for example, during a configuration step when web server 420 (or its operator) registers itself and/or web site 410 with profile server 30. During that configuration step, profile handler 430 will provide profile server 30 (optionally through server interface 32) with the profile information and categories for which it wishes to obtain custom data 160 (e.g., favorite NFL quarterback). Once this configuration step occurs, web site 410 can be referred to as registered web site 415 and web server 420 can be referred to as registered web server 425. User interface 250 displays the URL 251 of the website for which the information is being sought. User interface optionally can be displayed on client 10 when User 15 first visits a website corresponding to URL 251.

User interface 250 comprises a series of input devices that enable User 15 to input profile information specific to the website corresponding to URL 251. For example, input device 252 obtains information about Variable N, input device 253 obtains information about Variable N+1, input device 254 obtains information about Variable N+2, input device 255 obtains information about Variable N+3, and input device 256 obtains information about Variable N+i (where i can be any integer value). It is to be understood that other input devices can be displayed between input device 255 and input device 256 if i is greater than 4.

Once User 15 inputs data into profile setup extension 120, profile setup extension 120 will communicate with profile data server 30 (optionally through client interface 31). Profile data server 30 will obtain and store the user data from profile setup extension 120. Optionally, profile data server 30 comprises a relational database such as MySQL or a NoSQL database such as MongoDB, and the user data structure can be stored as a table where the key and user name are unique IDs associated with User 15.

Figure 7:
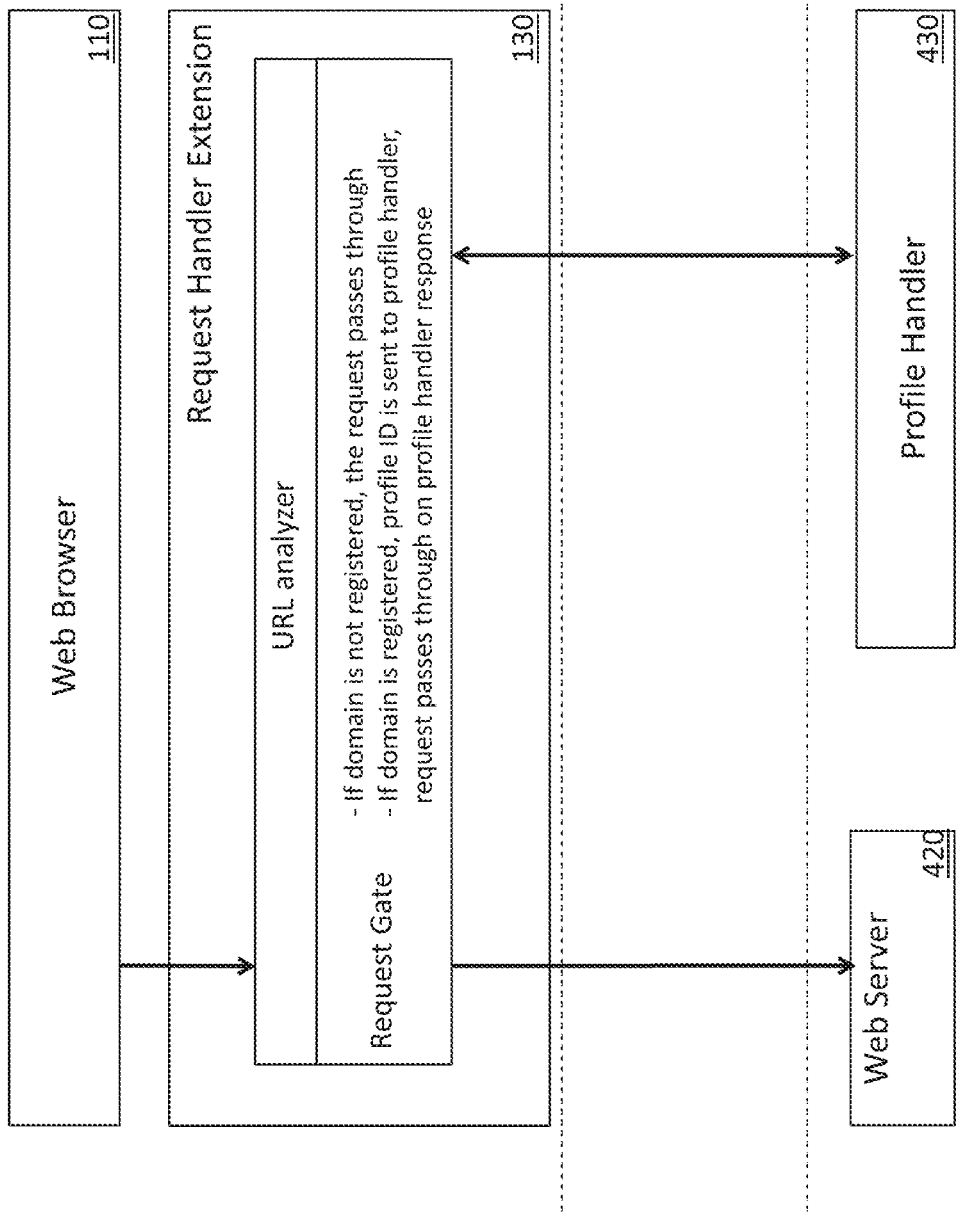
FIG. 7. depicts a method of transferring profile information to a web server.

Thereafter, when User 15 operates web browser 110 to access web site 410 (here, located at www.example.com), request handler extension 130 will intercept that request and will communicate with profile handler 430 to determine if web site 410 is a registered web site 415. If it is not, then client 10 will access web site 410 as in the prior art. However, if web site 410 is a registered web site 415, then web server 420 will request and obtain profile information for that user from profile handler 430. In this manner, and without User 15 logging in or providing profile information to web server 420, web server 420 is able to obtain the user profile information. Web server 420 can then tailor the contents of web site 410 and/or its advertisements to User 15. This process is depicted in FIG. 7.

Figure 5:
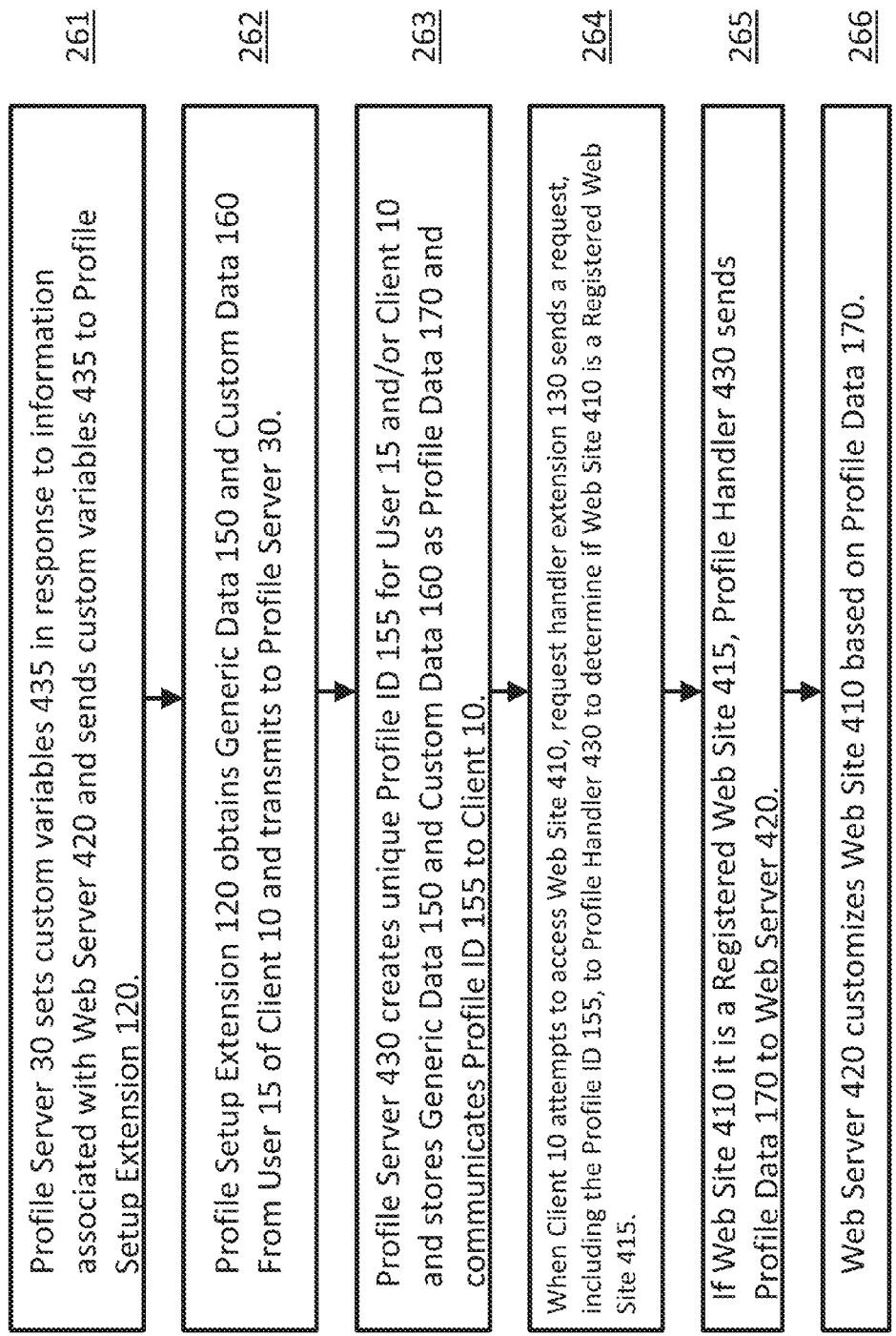
FIG. 5 depicts a method for obtaining profile information and transferring that information to a web server.

With reference now to FIG. 5, a method is depicted that is performed in conjunction with the embodiments described herein. Profile Server 30 sets custom variables 435 in response to information received from web server 420 during the configuration step and sends custom variables 435 to profile setup extension 120 (step 261). Profile setup extension 120 obtains generic data 150 and custom data 160 from User 15 of client 10 and transmits them to profile server 30 (step 262). Profile server 30 creates a unique Profile ID 155 for User 15 and/or client 10 and stores generic data 150 and custom data 160 as profile data 170 and communicates profile ID 155 to client 10 (step 263). When client 10 attempts to access web site 410, request handler extension 130 sends a request, including the Profile ID 155, to profile handler 430 to determine if web site 410 is a registered web site 415 (step 264). If it is a registered web site 415 (and/or if web server 420 is a registered web server 425), profile handler 430 sends profile data 170 to web server 420 (step 265). Web server 420 customizes web site 410 (or other content) based on profile data 170 (step 266).

Figure 6:
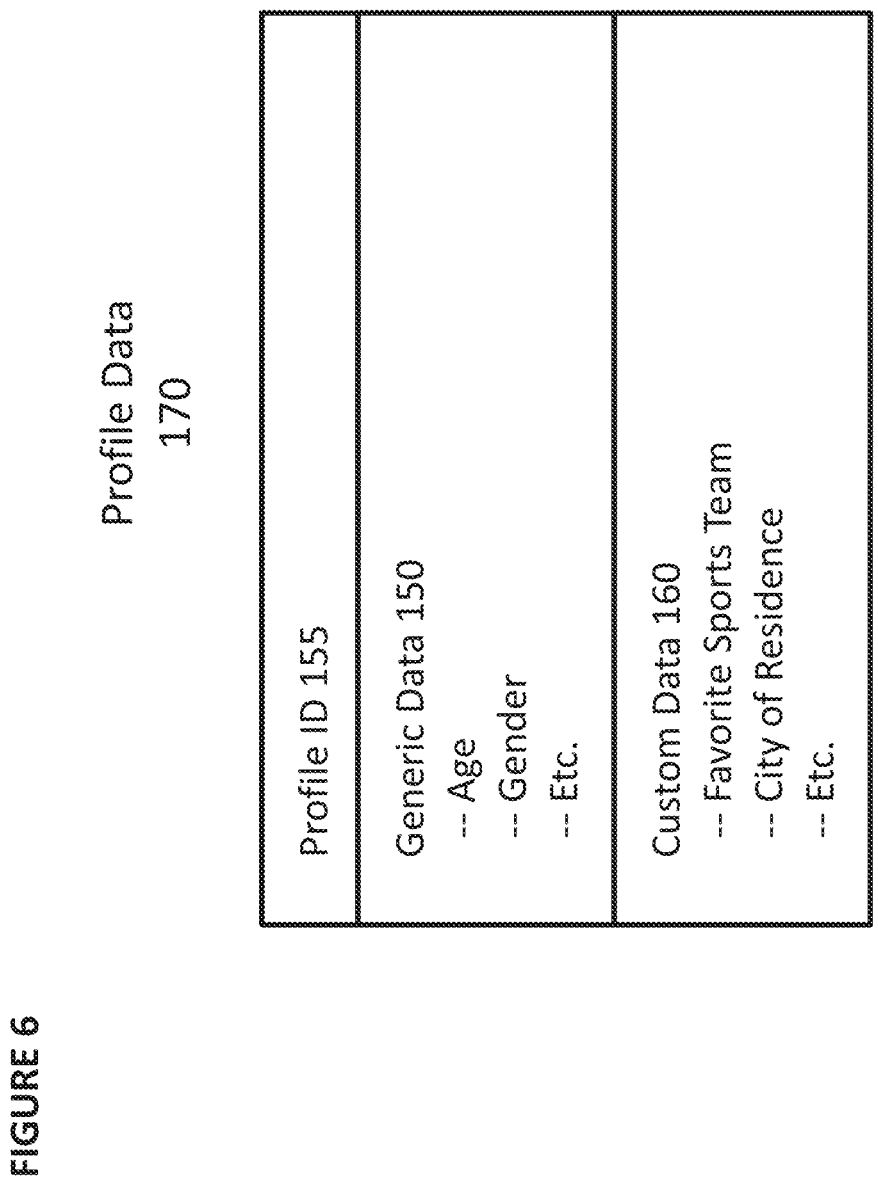
FIG. 6 depicts an embodiment of a data structure for profile information.

FIG. 6 depicts an exemplary embodiment of profile data 170. Profile data 170 can be stored in a data structure, such as in a table within a relational database such as a MySQL database. Profile Data 170 comprises data structures including generic data 150 and custom data 160. Profile data 170 optionally can be stored in a relational database, as discussed previously.

Figure 8:
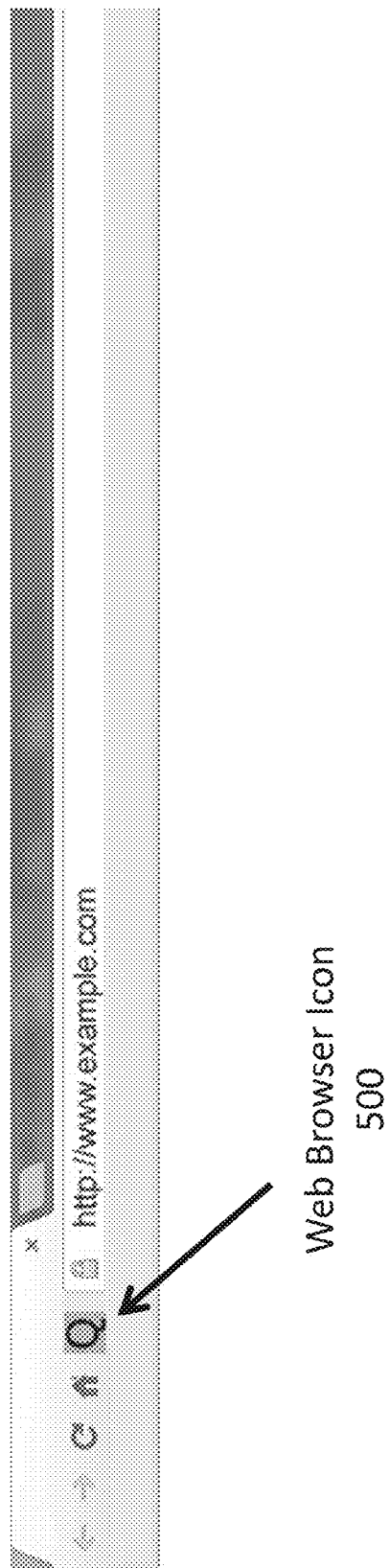
FIG. 8. depicts a web browser icon to indicate that profile information has been transferred.

With reference to FIG. 8, when User 15 accesses web site 410 using web browser 110 on client 10, web browser 110 optionally can display web browser icon 500 that signifies that the web site 410 is a registered web site 415. User 15 optionally can click on web browser icon 500 to edit the parameters. If User 15 clicks on web browser icon 500, user interfaces such as user interface 200 and user interface 250 as shown in FIGS. 3 and 4 can be used to collect the new data.

Figure 9:
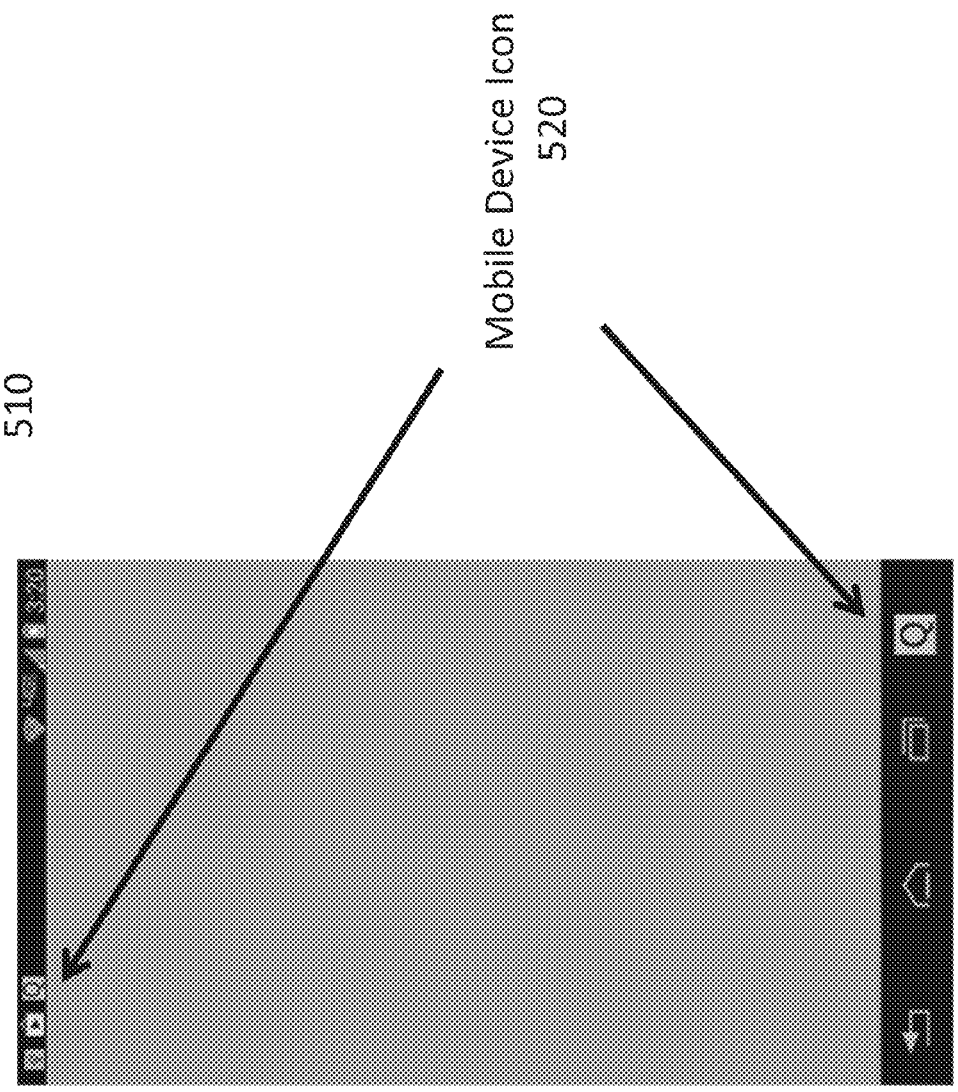
FIG. 9. depicts a mobile device icon to indicate that profile information has been transferred.

One of ordinary skill in the art will appreciate that client 10 can access web server 420 without using web browser 110. With reference to FIG. 9, if client 10 is a mobile device (such as a smartphone or tablet) and if User 15 accesses web server 420 using an application 510 other than a web browser (such as a native mobile application), then mobile application icon 520 can be displayed. Mobile application icon 520 signifies that the web server 420 is a registered web server 425. User 15 optionally can click on mobile application icon 520 to edit the parameters. If User 15 clicks on mobile application icon 520, user interfaces such as user interface 200 and user interface 250 as shown in FIGS. 3 and 4 can be used to collect the new data. This embodiment would be useful to tailor advertisements, or to provide certain content or suggest certain content, for User 15 according to Profile Data 170 when User 15 is operating an application on client 10.

Figure 10:
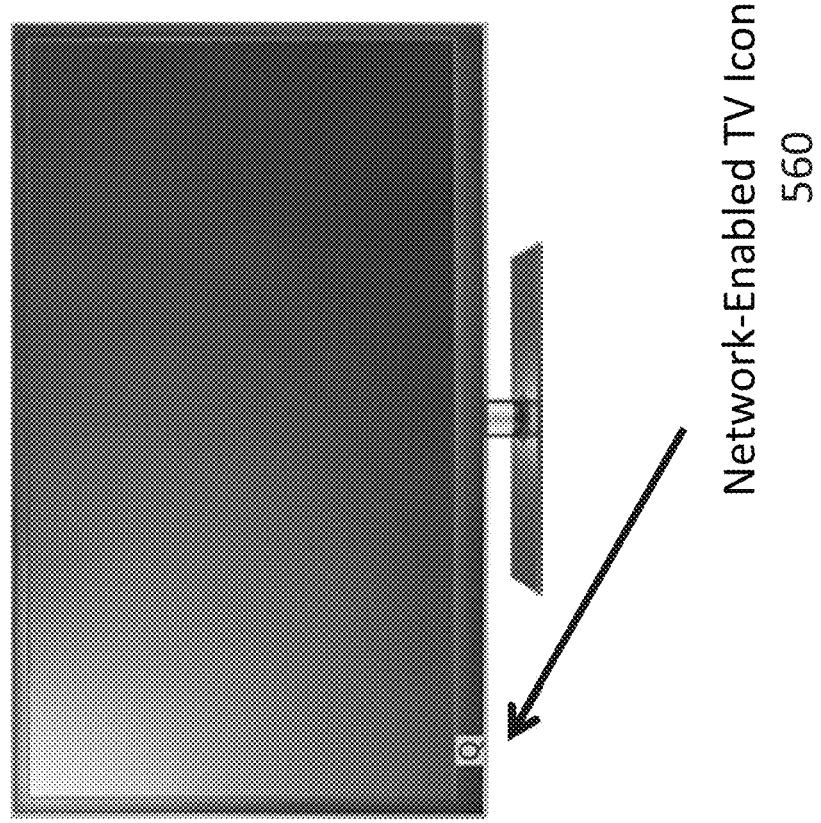
FIG. 10 depicts a network enabled TV icon to indicate that profile information has been transferred.
Figure 11:
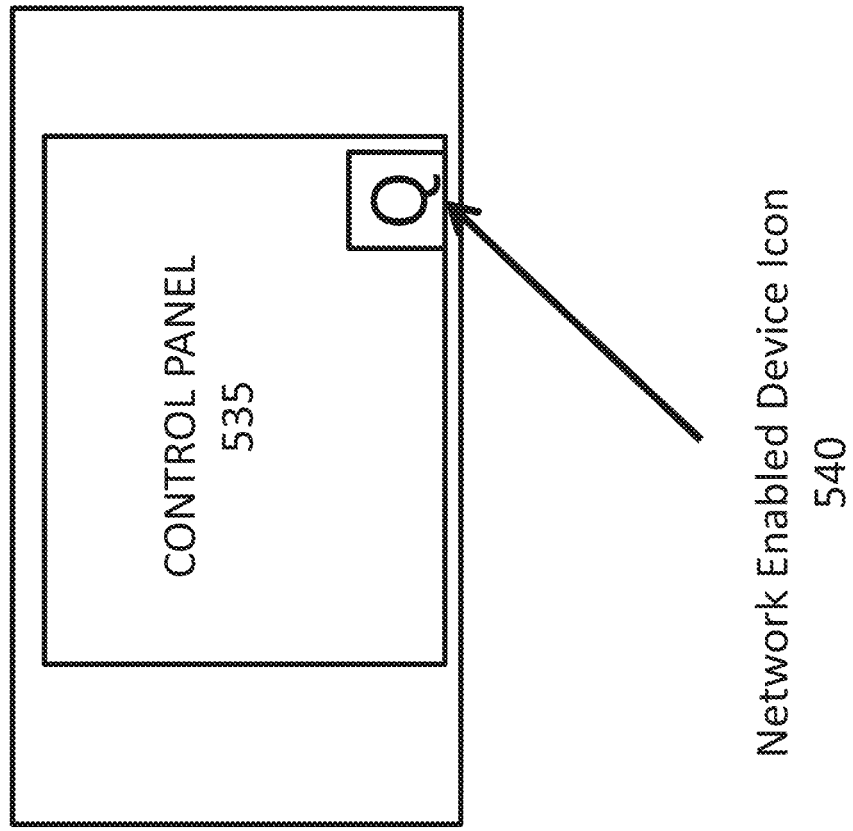
FIG. 11. depicts a network enabled device icon to indicate that profile information has been transferred.

With reference to FIG. 10, if client 10 is a network enabled TV 550 and if the User accesses web server 420 with network enabled TV 550, then network enabled TV icon 560 can be displayed on the screen of network enabled device TV 550. In this situation, web server 420 typically will provide a "TV channel" to client 10. Network enabled TV icon 560 signifies that the web server 420 is a registered web server 425. User 15 optionally can select network enabled TV icon 560 to edit the parameters. If User 15 clicks on network enabled TV icon 560, user interfaces such as user interface 200 and user interface 250 as shown in FIGS. 3 and 4 can be used to collect the new data. This embodiment would be useful to tailor advertisements, or to provide certain content or suggest certain content, for User 15 according to Profile Data 170. With reference to FIG. 11, if client 10 is any network enabled device 530 (such as the network enabled TV 550, or another network enabled device such as a car) and if the client 10 accesses web server 420 with the network enabled device 530, then network enabled device icon 540 can be displayed on control panel 535 of network enabled device 530. Network enabled device icon 540 signifies that the web server 420 is a registered web server 425. User 15 optionally can click on network enabled device icon 540 to edit the parameters. If User 15 clicks on network enabled device icon 540, user interfaces such as user interface 200 and user interface 250 as shown in FIGS. 3 and 4 can be used to collect the new data. This embodiment would be useful to tailor advertisements or other content for User 15 according to Profile Data 170.

The characteristics of icons 500, 520, 540, and 560 can be altered to convey information to the user. For example, if icon 500, 520, 540, or 560 is one color (e.g., green), that color can be used to indicate that the parameters set by the user in Profile Setup Extension 120 are being utilized by registered web site 415 or registered web server 425. If icon 500, 520, 540, or 560 is a different color (e.g., orange), that color can be used to indicate that custom parameters are available from server 40. In this instance, User 15 may decide to click on the icon to edit the parameters (such as by adding in the information requested by custom parameters). If web site 410 is not a registered web site 415 and/or web server 420 is not a registered web server 425, then icon 500, 520, 540, and 560 optionally could be displayed as a third color (e.g., red) or could not be displayed. One of ordinary skill in the art that characteristics other than color can be used to convey this information through icons 500, 520, 540, and 560, such as size, font, blinking/steady, an "X" or slash mark, or other graphical alterations to the icon itself.

One of ordinary skill in the art will understand that in the web browser embodiments discussed above, a user will be able to visit web site 410 and have that web site 410 automatically tailored to the interested of that user without the user needing to login in to web site 410 or to provide profile information to web site 410. Instead, the user inputs profile information in response to queries by the profile setup extension 120 within client 10, and that information is automatically sent to server 40 via profile server 30 when the user attempts to access web site 410 operated by server 40. This can create a seamless web experience for the user where web site 410 will be tailored to his or her interests.

One of ordinary skill in the art will understand that in the embodiments discussed above that do not utilize a web browser, User 15 will be able to interact with web server 420 and have the content from web server 420 automatically tailored to the interested of User 15 without User 15 needing to login in to web server 420 or to provide profile information to web server 420. Instead, User 15 inputs profile information in response to queries by the profile setup extension 120 within client 10, and that information is automatically sent to server 40 via profile server 30 when User 15 attempts to access web server 420 operated by server 40. This can create a seamless experience for User 15 where web server 420 will tailor content to his or her interests.

Figure 12:
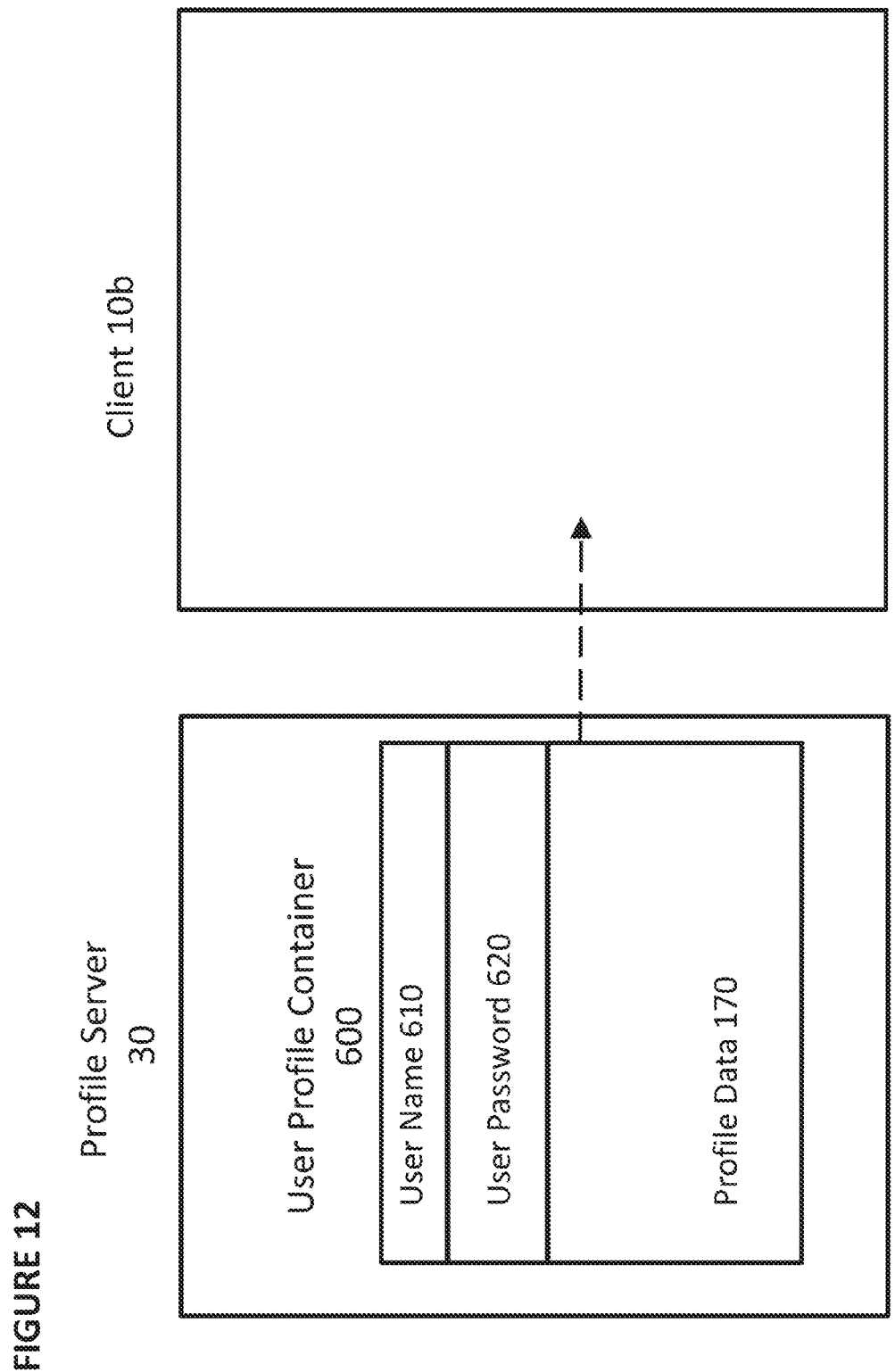
FIG. 12. depicts a mechanism for transferring profile information to a client.

With reference to FIG. 12, an embodiment is shown to enable User 15 to move his or her profile data 170 from client 10*a* to client 10*b* (where client 10*a* and client 10*b* each are instances of client 10). Profile setup extension 120 on client 10*a* enables User 15 to establish a user name 610 and user password 620. That information is stored either in profile data 170 itself or with profile data 170 in user profile container 600. User profile container 600 is stored on client 10*a* and on profile server 30 Thereafter, when User 15 operates client 10*b*, profile setup extension 120 on client 10*b* can request user profile container 600 (or profile data 170) in response to User 15 entering user name 610 and user password 620, and thereafter client 10*b* can store user profile container 600 or (profile data 170) locally. This is beneficial to User 15 because he or she will not need to enter the profile data 170 all over again on client 10*b* and will be able to transfer it directly onto client 10*b*. User 15 then will be able to utilize client 10*b* to obtain the benefits of the embodiments described herein.

References to the present invention herein are not intended to limit the scope of any claim or claim term, but instead merely make reference to one or more features that may be covered by one or more of the claims. Materials, processes and numerical examples described above are exemplary only, and should not be deemed to limit the claims. It should be noted that, as used herein, the terms "over" and "on" both inclusively include "directly on" (no intermediate materials, elements or space disposed there between) and "indirectly on" (intermediate materials, elements or space disposed there between). Likewise, the term "adjacent" includes "directly adjacent" (no intermediate materials, elements or space disposed there between) and "indirectly adjacent" (intermediate materials, elements or space disposed there between).

What is claimed is:
1. A client computer comprising:
   a processor within the client computer;
   a first module, executed by the processor, that generates a user interface, obtains profile information from a user of the client computer through one or more prompts provided by the user interface, provides the profile information to a profile server, and receives a profile ID that uniquely identifies the user from the profile server, wherein the profile server is on a different local network than the client computer, wherein the profile information comprises information other than a user name and a user password; and a second module, executed by the processor, that intercepts a request from the client computer intended for a web server on a different local network than the client computer and profile server, generates a modified request comprising the profile ID and sends the modified request to the web server, wherein the modified request does not include a user name and a user password for the user.

2. The computer of claim 1, wherein the profile information comprises at least one of age and gender.

3. The computer of claim 1, wherein the first module obtains a user name and a user password from the user.

4. A profile server for interacting with a client and a web server, comprising:
   a client interface for communicating with the client, wherein the client interface is configured to send profile parameters to the client and to receive profile information from the client and to generate a profile ID associated with the profile information that uniquely identifies a user of the client and to send the profile ID to the client, wherein the profile information comprises information other than a user name and a user password; and
   a server interface for communicating with a web server, the profile server and web server located on different local networks, wherein the server interface is configured to provide the profile information to the web server in response to a request comprising the profile ID from the web server after the web server receives the profile ID from the client, wherein the web server does not receive a user name and a user password from the client, wherein the profile ID was not stored by the web server prior to receiving the profile ID from the client, and wherein the server interface does not provide the web server with a user name and a user password for the user of the client.

5. The profile server of claim 4, wherein the profile parameters comprises at least one of age and gender.

6. The profile server of claim 5, wherein the profile information comprises at least one of age and gender.

7. The profile server of claim 4, wherein the profile information comprises generic data.

8. The profile server of claim 4, wherein the profile information comprises custom data.

9. The profile server of claim 4 further comprising a data store for storing the profile information and a profile ID.

10. The profile server of claim 9, wherein the data store comprises a relational database.

11. The profile server of claim 10, wherein the profile ID is a key to the database.

12. The profile server of claim 4, wherein the profile information is associated with a user ID and a user password.

13. The profile server of claim 12, wherein the first module is configured to send the profile information to a second client in response to a request that includes the user ID and the user password.

14. A method of establishing profile information for a user and automatically transferring the profile information from a profile server to a web server in response to a request to the web server from a client operated by the user, comprising:
   creating, by the profile server, a profile ID that uniquely identifies the user;
   setting custom variables, by the profile server, in response to information received from the web server;
   sending the custom variables and the profile ID, by the profile server, to a client;
   obtaining, by the profile server, profile information input by the user on the client in response to the custom variables, wherein the profile information comprises information other than a user name and a user password;
   receiving, by the web server, a request comprising the profile ID from the client, wherein the request does not include a user name and a user password, and wherein the web server and profile server are part of different local networks and are each independently accessible over the Internet, and wherein the web server had not previously stored the profile ID;
   sending, by the web server, the profile ID to the profile server;
   accessing, by the profile server, the profile information using the profile ID;
   sending, by the profile server, the profile information to the web server, wherein the profile server does not provide the web server with a user name and a user password for the user; and
   generating, by the web server, content for the client using at least part of the profile information;
   wherein the user is anonymous as to the web server.

15. The method of claim 14, wherein the obtaining step comprises generating a user interface and obtaining at least a portion of the profile information using the user interface.

16. The method of claim 14, further comprising the step of tailoring, by the second server, content sent to the client from the second server based on the profile information obtained from the first server.

17. The method of claim 14, further comprising the step of generating an icon on a display of the client to indicate that the content is based in part on the profile information.

18. The method of claim 14, wherein the request is generated by a web browser.

19. The method of claim 14, wherein the request is not generated by a web browser.

20. The method of claim 14, wherein the content comprises tailored advertisements.

* * * * *